United States Patent
Kim et al.

(10) Patent No.: US 7,516,347 B2
(45) Date of Patent: Apr. 7, 2009

(54) ELECTRONIC DEVICE HAVING POWER-DOWN MODE AND METHOD OF REDUCING POWER CONSUMPTION

(75) Inventors: Ju-Il Kim, Seoul (KR); Jee-Han Lee, Yongin-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 482 days.

(21) Appl. No.: 11/239,289

(22) Filed: Sep. 30, 2005

(65) Prior Publication Data

US 2006/0136766 A1 Jun. 22, 2006

(30) Foreign Application Priority Data

Dec. 22, 2004 (KR) .................... 10-2004-0110505

(51) Int. Cl.
*G06F 1/32* (2006.01)
(52) U.S. Cl. ...................... 713/324; 713/320
(58) Field of Classification Search ......... 713/300–320, 713/323, 324
See application file for complete search history.

(56) References Cited

U.S. PATENT DOCUMENTS

| | | | |
|---|---|---|---|
| 5,483,464 A * | 1/1996 | Song | 713/300 |
| 6,256,252 B1 * | 7/2001 | Arimoto | 365/227 |
| 6,952,748 B1 * | 10/2005 | Guerrero et al. | 710/113 |
| 2003/0101362 A1 * | 5/2003 | Dia | 713/300 |
| 2005/0110787 A1 * | 5/2005 | Lin | 345/211 |
| 2006/0047986 A1 * | 3/2006 | Kurts et al. | 713/320 |

FOREIGN PATENT DOCUMENTS

| | | |
|---|---|---|
| JP | 11-327701 | 11/1999 |
| JP | 2002-320380 | 10/2002 |
| JP | 2003-295988 | 10/2003 |
| KR | 2003-0004614 | 1/2003 |

OTHER PUBLICATIONS

Korean Patent Office Action dated Feb. 28, 2006, corresponding to Korean Patent Application No. 2004-110505, with English translation.

* cited by examiner

*Primary Examiner*—Dennis M Butler
(74) *Attorney, Agent, or Firm*—Harness, Dickey & Pierce

(57) ABSTRACT

Example embodiments of the present invention disclosed herein relate to an electronic device having a power-down mode. The electronic device includes a regulator, a central processing unit, and an interrupt control unit. The regulator is disabled during the power-down mode to reduce consumption of power.

18 Claims, 3 Drawing Sheets

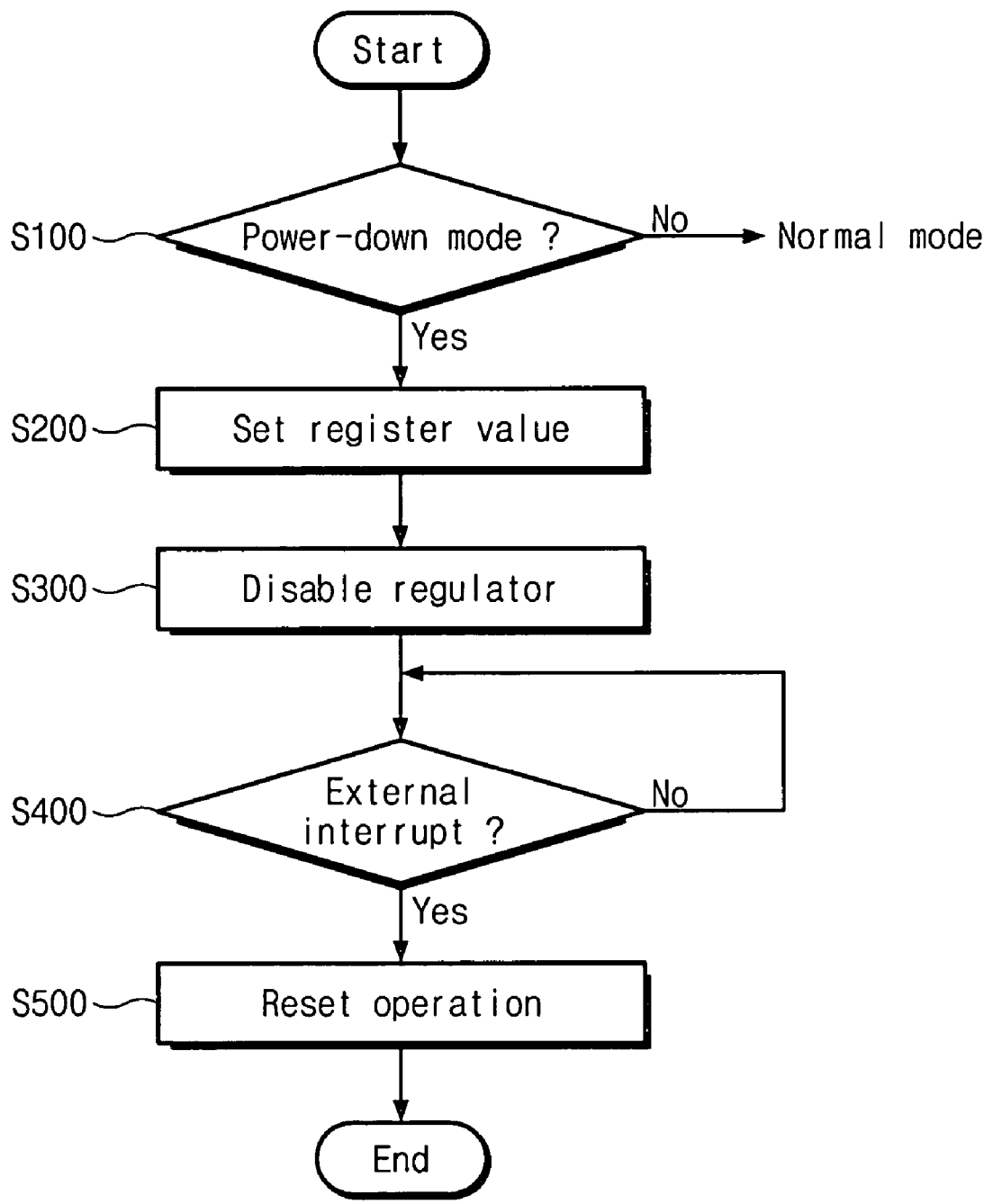

ELECTRONIC DEVICE HAVING POWER-DOWN MODE AND METHOD OF REDUCING POWER CONSUMPTION

PRIORITY STATEMENT

A claim of priority under 35 U.S.C. §119 is made to Korean Patent Application 2004-110505 filed on Dec. 22, 2004, the entire contents of which are hereby incorporated by reference.

BACKGROUND OF THE INVENTION

1. Field of the Invention

Example embodiments of the present invention generally relate to an electronic device. More particularly, example embodiments of the present invention relates to a method of reducing power consumption in electronic devices.

2. Description of the Related Art

In general, many electronic devices support a power-down mode in order to reduce power consumption. For example, when an electronic device enters a power-down mode after a predetermined condition is satisfied, operations of a central processing unit (CPU) and peripheral circuits in the electronic device may be stopped.

In order return to a normal mode from the power-down mode, it is necessary for a user to apply an interrupt signal or a reset signal.

As electronic devices have become more integrated, the CPU and peripheral circuits have scaled down. Accordingly, highly integrated circuits employ regulators to lower a high power supply voltage to a low operation voltage.

However, the regulator supplies operational voltage to the CPU and the peripheral circuits during the power-down mode, thereby consuming power.

SUMMARY OF THE INVENTION

In an embodiment of the present invention, an electronic device having a power-down mode includes a regulator adapted to convert a power supply voltage, a processor adapted to receive the regulated voltage and adapted to disable the regulator when the electronic device enters a power-down mode, and an interrupt control unit adapted to receive the power supply voltage and adapted to perform a reset operation in response to a reset signal or an interruption signal.

In another embodiment of the present invention, an electronic device includes a regulator adapted to convert a power supply voltage, a processor adapted to receive the regulated voltage and adapted to determine whether a power-down mode or a power-saving mode has been initiated, a register adapted to be controlled by the central processing unit and adapted to set the power-down mode or the power-saving mode and a disable/enable state of the regulator, and an interrupt control unit adapted to perform a reset operation to initialize the register in response to a reset signal or an interrupt signal, wherein the regulator is disabled in the power-down mode, and the register is not disabled in the power-saving mode.

In an embodiment of the present invention, a method of reducing power consumption in an electronic device includes detecting whether the electronic device has entered a power-down mode, disabling a regulator in the power-down mode to shut off a supply of a regulated voltage to a processor, and supplying direct power voltage to a register and interrupt control unit in the power-down mode.

BRIEF DESCRIPTION OF THE DRAWINGS

The accompanying drawings are included to provide a better understanding of example embodiments of the present invention, and are incorporated in and constitute a part of this specification. The drawings together with the description, serve to explain the example embodiments of the present invention. In the Figures, the same reference numerals are used to denote the same elements throughout the drawings. In the drawings:

FIG. 3 is a flowchart illustrating a method of reducing power consumption of an electronic device according to an exampleexample embodiment of the present invention.

DETAILED DESCRIPTION OF EXAMPLE EXAMPLE EMBODIMENTS

Hereinafter, example embodiments of the present invention will be described in detail with reference to the accompanying drawings.

Figure 1:
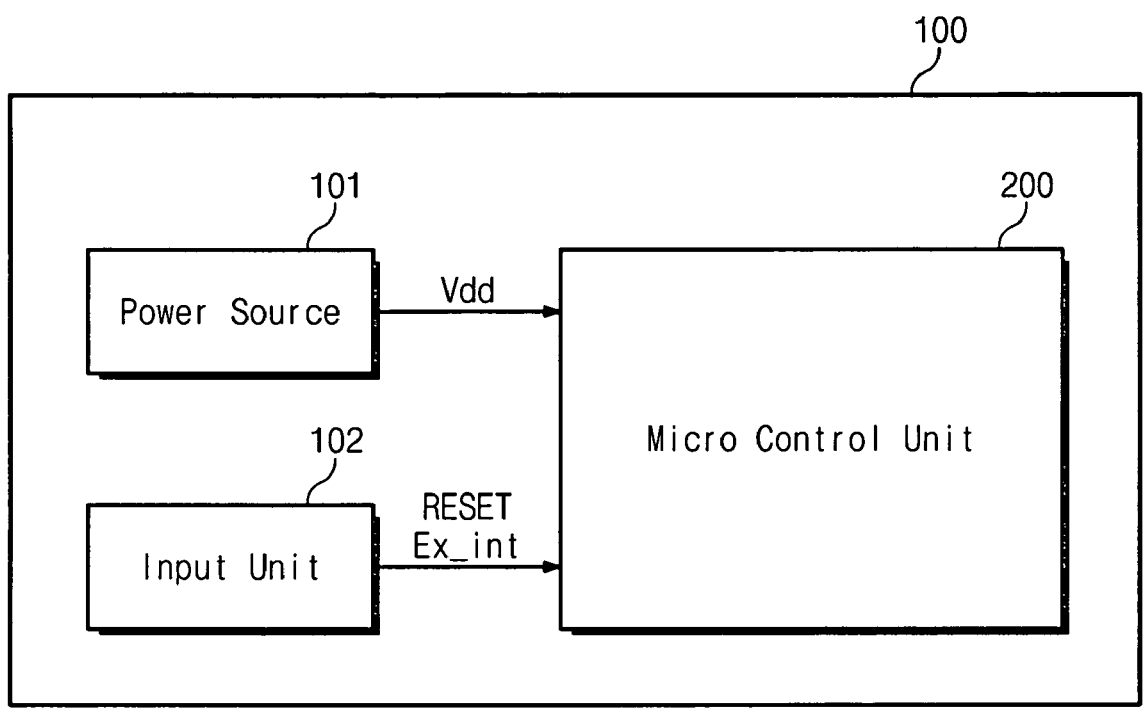
FIG. 1 is a schematic block diagram illustrating an electronic device according to an example embodiment of the present invention.

FIG. 1 is a schematic block diagram illustrating an electronic device according to an example embodiment of the present invention. Referring to FIG. 1, an electronic device 100 may include a power source 101, an input unit 102, and a micro control unit 200.

The power source 101 provides a power supply voltage Vdd to the micro control unit 200. The input unit 102 may transmit input signals using, for example, a key pad, touch pad, touch screen, mouse, etc., by a user to the micro control unit 200.

Figure 2:
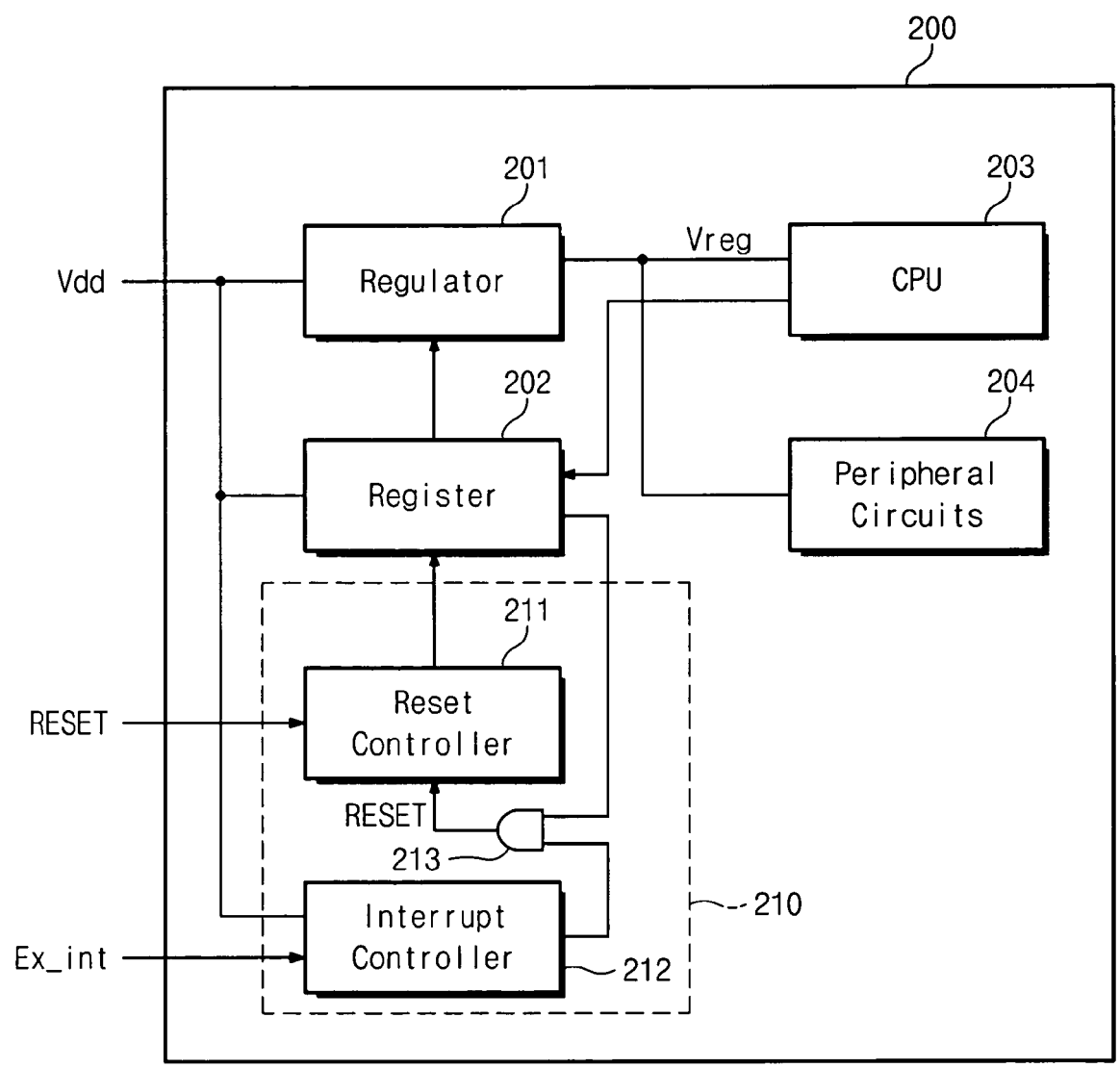
FIG. 2 is a schematic block diagram illustrating a micro control unit of FIG. 1 according to an example embodiment of the present invention.

FIG. 2 is a schematic block diagram illustrating the micro control unit 200 of FIG. 1 according to an exampleexample embodiment of the present invention. Referring to FIG. 2, the micro control unit 200 may include a regulator 201, a register 202, an interrupt control unit 210, a processor 203, e.g., central processing unit or microcontroller, and peripheral circuits 204.

The regulator 201 may convert the power supply voltage Vdd supplied from the power source 101 to an operation voltage Vreg. To operate, the processor 203 and the peripheral circuits 204 require the operation voltage Vreg.

The register 202 may be controlled by the processor 203. The register 202 may be used as a storage device to control the operation state (enable/disable state of the regulator 201). The processor 203 detects whether or not the electronic device enters into a power-down mode.

If an electronic device enters a power-down mode, the processor 203 sets a register value of the register to a high level (logic "1") in order to reduce power consumption. A power-down mode may mean that an oscillator (not shown), which generates a system clock, is not operational.

The interrupt control unit 210 may perform a reset operation when an external interruption occurs during the power-down mode. The interrupt control unit 210 may consist of an AND-gate 213, a reset controller 211, and an interrupt controller 212. Although in this example embodiment, an AND-gate is depicted, other logic gates may be used, such as an OR-gate, XOR-gate, XNOR-gate, or a combination of the gates. One terminal of the AND-gate 213 is connected to the register 202, and another terminal of the AND-gate 213 is connected to the interrupt controller 212, and an output terminal is connected to a reset controller 211. The AND-gate 213 may output a reset signal RESET to the reset controller 211 when output values of the register 202 and interrupt controller 212 are in a high level (logic "1"). Therefore, the reset controller 211 may perform a reset operation to initialize an operation of the micro controller unit 200 in response a reset signal RESET by the AND-gate 213, or a reset signal RESET from the input unit. In other words, the reset controller 211 initializes the register value 202 to have a low level (logic "0"), which enables the regulator 201. The interrupt controller 212 may be a detection circuit to detect an external interruption, e.g., detect an interrupt signal Ex_int from the input unit 102. If an external interruption occurs, the interrupt controller 212 outputs a high level signal to the AND gate 213.

The register 202, the reset controller 211, and the interrupt controller 212 are connected to the power source 101 and directly receive the power supply voltage Vdd; therefore, they can operate during a power-down mode even if the regulator 201 is disabled.

A reset operation is performed when the power-down mode changes into a normal mode in response to an external interruption. As a result, states of the processor 203 and peripheral circuits 204 do not to be saved before entering into the power-down mode. Accordingly, it is possible to reduce power consumption by disabling the regulator 201 during the power-down mode.

FIG. 3 is a flowchart illustrating a method of reducing power consumption by the regulator 201 according to an exampleexemple embodiment of the present invention. Referring to FIG. 3, the processor 203 determines whether a power-down condition has been met (S100). The condition may be a direct input by a user, or no input for a predetermined time. If an electronic device enters into the power-down mode, the processor 203 sets a register value of the register 202 to a high level (logic "1"). If the register value of the register 202 is set to a high level, the regulator 201 is disabled, and power is shut off to the processor 203 and the peripheral circuits 204. However, the register 202, reset controller 211, and the interrupt controller 212 continue to receive power supply voltage Vdd from the power source 101.

If an interrupt signal Ex_int from the input unit 102 is received by the interrupt controller 212, the interrupt controller 212 outputs a high level signal to the AND gate 213 (S400). In this case, since the register 202 has a high level value, the AND gate 213 sends a reset signal RESET, e.g., a high level signal, to the reset controller 211. The reset controller 211 performs a reset operation to initialize the operation of the micro controller unit 200 in response to the reset signal RESET (S500). The register value of the register 202 is initialized to a low level to enable the regulator 201. Accordingly, the regulator 201 provides an operation voltage Vreg to the central processing unit 203 and the peripheral circuits 204.

During a normal mode in which the micro control unit 200 is in normal operation, the register value of the register 202 is set to a low level (logic "0"). In other words, the value of the register 202 is initialized to a low level. Accordingly, even if the interrupt controller 212 outputs a high level signal, a low level signal is output from an output terminal of the AND gate 213. As a result, the reset controller 211 cannot perform a reset operation.

Besides a power-down mode, a power-saving mode in which the regulator 201 is not disabled can also be set with an example embodiment of the present invention. The central processing unit 203 detects whether a power-saving entering mode condition is satisfied. In this case, the central processing unit 203 sets a value indicating whether the power-saving mode or power-down mode has started or not, in addition to enable/disable states. During the power-saving mode, the regulator 201 is enabled. Even if the interrupt signal Ex_int from the unit 102 is input to the interrupt controller 212, the AND gate 213 outputs a low level signal to the register 202. Thus, a reset operation is not performed by an external interruption, and the micro controller unit 200 starts the operation again.

Variations may be made to the example embodiments of the present invention without departing from the scope of the present invention.

What is claimed is:

1. An electronic device, comprising:
   a regulator adapted to convert a power supply voltage to a regulated power supply voltage;
   a processor adapted to receive the regulated power supply voltage and adapted to disable the regulator when the electronic device enters a power-down mode; and
   an interrupt control unit adapted to receive the power supply voltage and adapted to perform a reset operation in response to a reset signal or an interrupt signal, wherein the interrupt control unit includes a logic gate having input terminals connected to a register and an interrupt controller and an output terminal connected to a reset controller.

2. The electronic device of claim 1, wherein
   the interrupt controller is adapted to output reset information in response to the interrupt signal; and
   the reset controller is adapted to control the reset operation in response to the reset information or the reset signal.

3. The electronic device of claim 2, wherein the register is adapted to receive a signal from the processor to disable the regulator in the power-down mode, and is further adapted to enable the regulator in response to the reset information or the reset signal.

4. The electronic device of claim 3, wherein the register and the interrupt control unit are adapted to directly receive the power supply voltage.

5. The electronic device of claim 2, wherein the reset signal and the interrupt signal are input from an input unit.

6. The electronic device of claim 1, wherein the logic gate is an AND gate.

7. The electronic device of claim 1, wherein the power supply voltage is supplied from a power source.

8. The electronic device of claim 1, further comprising peripheral circuits adapted to receive the regulated power supply voltage.

9. The electronic device of claim 8, wherein the regulated power supply voltage is shut off to the processor and the peripheral circuits during the power-down mode.

10. An electronic device comprising:
    a regulator adapted to convert a power supply voltage to a regulated power supply voltage;
    a processor adapted to receive the regulated power supply voltage and adapted to determine whether a power-down mode or a power-saving mode has been initiated;
    a register adapted to be controlled by the processor and adapted to set the power-down mode or the power-saving mode and a disable/enable state of the regulator; and
    an interrupt control unit adapted to perform a reset operation to initialize the register in response to a reset signal or an interrupt signal, wherein the regulator is disabled in the power-down mode and the register is not disabled in the power-saving mode; and wherein the interrupt control unit includes a logic gate having input terminals connected to the register and an interrupt controller, and an output terminal connected to a reset controller.

11. The electronic device of claim 10, wherein the interrupt controller is adapted to output reset information in response to the interrupt signal; and the reset controller is adapted to control the reset operation in response to the reset information or the reset signal.

12. The electronic device of claim 10, wherein the logic gate is an AND gate.

13. The electronic device of claim 10, wherein the power supply voltage is supplied from a power source.

14. The electronic device of claim 10, wherein the register and the interrupt control unit are adapted to directly receive the power supply voltage.

15. A method of reducing power consumption in an electronic device, comprising:

detecting whether the electronic device has entered a power-down mode;

disabling a regulator in the power-down mode to shut off a supply of a regulated voltage to a processor in the electronic device; and supplying direct power voltage to a register and interrupt control unit in the power-down mode, wherein the interrupt control unit includes a reset controller, an interrupt controller, and a logic gate having its input terminals connected to the interrupt controller and the register and its output terminal connected to the reset controller.

16. The method of claim 15, wherein the power-down mode is detected by the processor and the processor controls the register to disable the regulator.

17. The method of claim 15, wherein the interrupt controller outputs reset information to the register in response to an interrupt signal, and wherein the register enables the regulator.

18. The method of claim 15, wherein the reset controller controls a reset operation in response to a reset signal, and wherein the register enables the regulator.

* * * * *